US 6,748,660 B2

(12) United States Patent
Buser et al.

(10) Patent No.: US 6,748,660 B2
(45) Date of Patent: Jun. 15, 2004

(54) DEBRIS-COLLECTION DEVICE FOR A POWER SAW

(76) Inventors: John P. Buser, 837 Cornish Dr., San Diego, CA (US) 92107; Terry R. Alley, 7602 SW. 60th St., Augusta, KS (US) 67010

( * ) Notice: Subject to any disclaimer, the term of this patent is extended or adjusted under 35 U.S.C. 154(b) by 64 days.

(21) Appl. No.: 10/147,128

(22) Filed: May 15, 2002

(65) Prior Publication Data

US 2003/0213482 A1 Nov. 20, 2003

(51) Int. Cl.⁷ ................................................ B67B 7/00
(52) U.S. Cl. ................................................ 30/12
(58) Field of Search .......................... 125/12; 451/451, 451/453, 456

(56) References Cited

U.S. PATENT DOCUMENTS

| | | | | | |
|---|---|---|---|---|---|
| 2,819,571 | A | * | 1/1958 | Morgan | 451/456 |
| 3,468,076 | A | * | 9/1969 | Jones | 451/456 |
| 3,882,598 | A | * | 5/1975 | Earle et al. | 30/390 |
| 4,002,182 | A | * | 1/1977 | Michel | 401/263 |
| 4,253,362 | A | * | 3/1981 | Olson | 83/100 |
| 4,576,072 | A | * | 3/1986 | Terpstra et al. | 83/102.1 |
| 5,084,972 | A | * | 2/1992 | Waugh | 30/124 |
| 5,167,215 | A | * | 12/1992 | Harding, Jr. | 125/13.01 |
| 5,440,809 | A | * | 8/1995 | Padilla | 30/124 |
| 5,564,408 | A | * | 10/1996 | Bassols | 125/12 |
| 5,675,895 | A | * | 10/1997 | Mori et al. | 30/124 |
| 5,931,072 | A | * | 8/1999 | Shibata | 83/98 |
| 6,318,352 | B1 | * | 11/2001 | Gnazzo et al. | 125/12 |
| 6,471,574 | B1 | * | 10/2002 | Rupprecht et al. | 451/451 |
| 6,557,261 | B1 | * | 5/2003 | Buser et al. | 30/124 |

* cited by examiner

Primary Examiner—M. Rachuba
(74) Attorney, Agent, or Firm—Frank G. Morkunas

(57) ABSTRACT

For a power cut-off saw, a debris-collection device pivotably mountable to the cut-off saw. The device has a collection chamber with a top slot and a front slot in communication with the top slot. Both slots are adapted to receive the cut-off saw blade; the front slot is adapted to capture dust from the cut. A debris-control component may, but need not, cover the top slot and permits entry of the saw blade but prevents dust from escaping. A discharge arm on the top of the collection chamber has a hollow channel which communicates with the collection chamber and facilitates the discharge of dust from the collection chamber by an externally connected vacuum source which suctions out the collected dust.

16 Claims, 3 Drawing Sheets

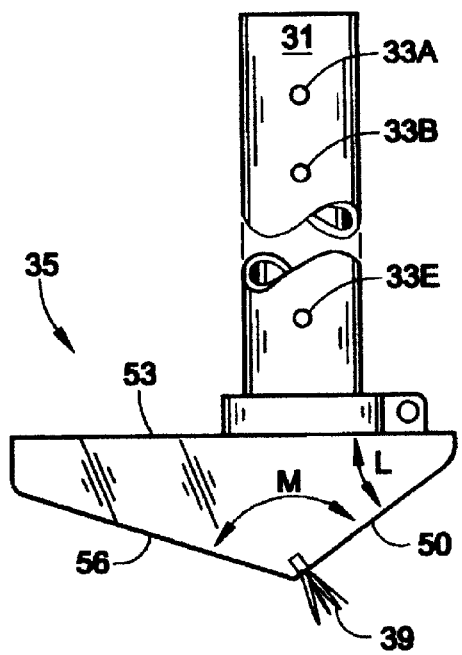
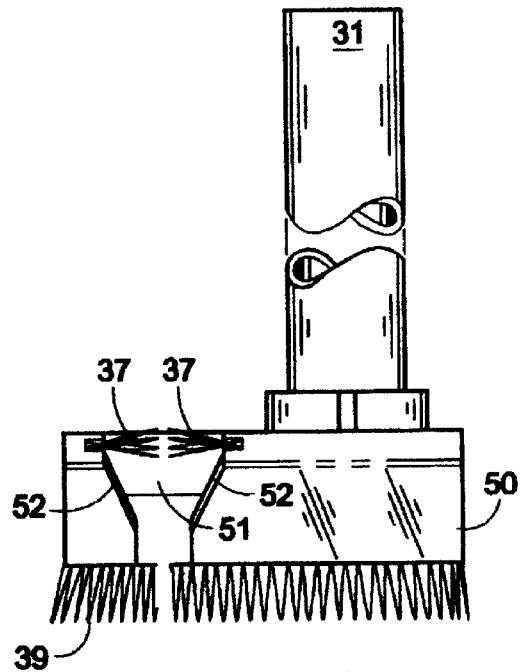
FIG. 3  FIG. 4
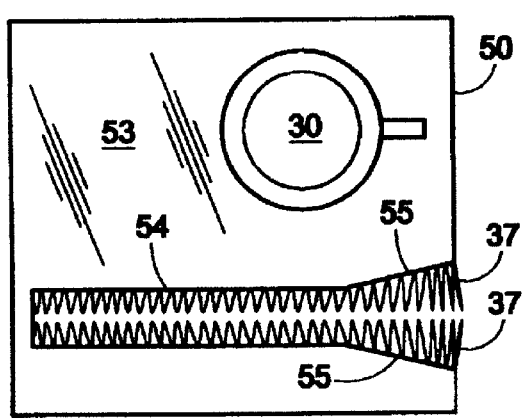
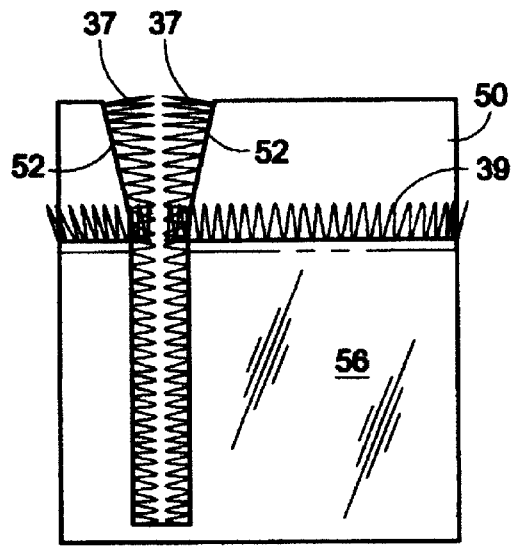
FIG. 5  FIG. 6

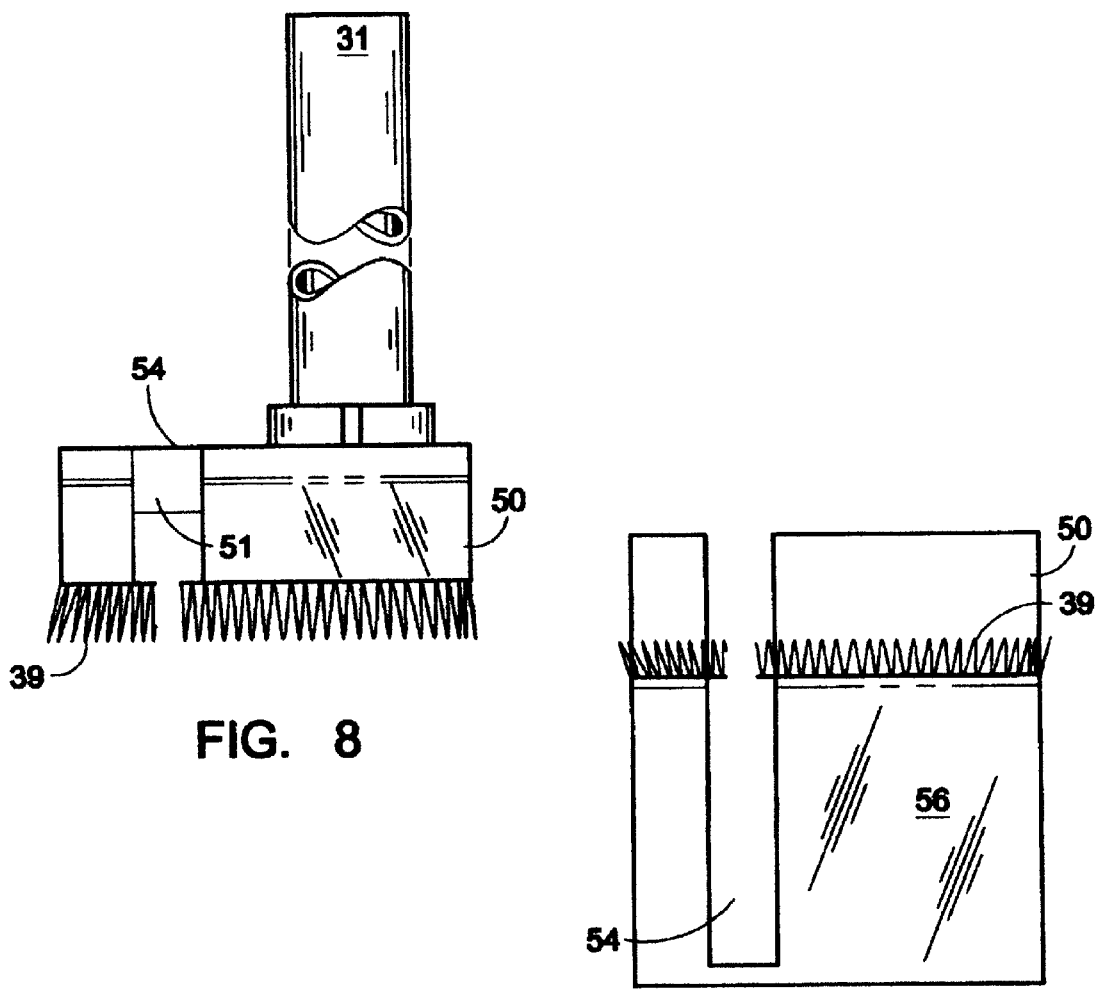
FIG. 8
FIG. 9
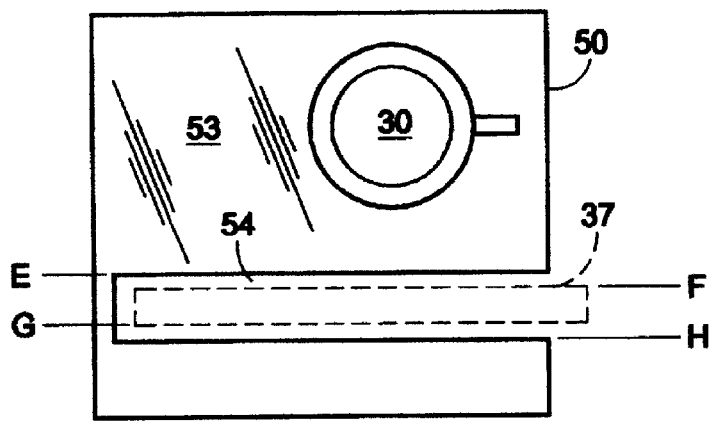
FIG. 10

DEBRIS-COLLECTION DEVICE FOR A POWER SAW

CROSS REFERENCES TO RELATED APPLICATIONS

None

STATEMENT REGARDING FEDERALLY-SPONSORED RESEARCH OR DEVELOPMENT

Not applicable

BACKGROUND OF THE INVENTION

This present invention relates to a revolutionary device for capturing and displacing debris generated when using a power tool, and more particularly to a power cut-off or concrete saw of any size.

Cut-off saws are used to make cuts into concrete. Such saws ranged in diameter from 10 inches to 20 inches. The most commonly used ranged between 12–16 inches. Whether shallow cuts [of about one-quarter inch] or deeper cuts of several inches are being made, cutting into solid concrete generates large amounts of concrete dust. Dust from these saws in operation can actually black-out a room [if done indoors] or cause substantial down wind pollution of up to 200 yards from the cutting venue. The dust, if left uncaptured or undercaptured, can permeate and contaminate the workplace and surrounding environment. The workplace may be a food processing facility, may be a health care facility, may have dust-sensitive equipment (such as a computer or delicate scientific or medical instruments), or may be a home. Various governmental regulatory agencies mandate some forms of dust control under many, if not all, commercial situations.

The worker using the cut-off saw also is at risk, not only from using a potentially dangerous tool but also from inhaling the dust. On-lookers, passers-by, employees of the facility at which work is being performed also will inhale the dust generated by the saw.

The only viable means of keeping such volumes of dust and debris under control are (1) through a wet system by adding water to the blade, generally through water holes in the blade shield, as a wet suppressant for the dust; or (2) through a dry system by use of an external vacuum placed near to the point where the blade meets and cuts the concrete, generally requiring two workers—the cutter and the cutter's vacuuming helper.

Using the wet system, though suitable for minimizing dust dispersement and pollution, creates another problem; water mixed with concrete dust results in the creation of an adhesive cementaceous mud which itself requires cleaning and removal. Usually a high-pressure stream of water will remove the mud. In many places, especially indoors or in environmentally critical habitats, such water removal is not possible or even permitted. Where it is possible and permitted, it is nonetheless expensive and labor-intensive. Using the dry system is not as efficient, requires an extra worker, and is, therefore, more costly.

Yet another method of curtailing dust contamination is use of a respirator or face mask to filter out dust before it can be inhaled. This method, however, is suited only for the worker or workers involved in the project and not for the passers-by, on-lookers, employees of the facility, nor the environment. Use of a respirator also increases costs associated with a project, is cumbersome, and adversely affects the mobility of the worker. As for a face mask, a good portion of the dust by-passes the face mask and is nonetheless inhaled by the worker.

Use of a dedicated vacuum in conjunction with the debris-collection device for capturing and removing concrete dust, as envisioned by the present invention is a remarkable and novel innovation.

There is no device available which is simple to use, which is easy to manufacture, and which captures virtually all the dust emitted by a cut-off power saw. The present invention embodies all these features and more; all which are not available in the prior art.

The present invention can be made of virtually any materials including, but not limited to, metals, plastics, and composites. It can be adapted to fit on virtually any type and size of cutoff power saw. When installed, it will not interfere with the operation of the saw; but, in fact, will enhance the life of the saw and the blade by preventing dust from entering and contaminating the saw motor and by removing excess dust from the blade immediately after a cut is being made. It is crafted to initiate the capturing of dust at or near to the initial point of dust creation; i.e., at the cutting point where the blade engages the material it is to cut—and, at that point, to capture and extract the dust. The device is crafted preferably to be used with an external vacuum system resulting in the ultimate capture and extraction of dust.

Accordingly, several objects and advantages of the present invention are to:

a. capture virtually all dust emitted by a cut-off saw in operation;

b. enhance the useful life of a cut-off saw and the saw blade;

c. self-adjust to capture dust regardless of the depth of the cut;

d. create a safer and healthier work environment, indoors and outdoors, for a user of a cut-off saw and for all others in or near the vicinity where such use is ongoing;

e. provide a dust capture device capable of being mounted onto cut-off saws of virtually all shapes, sizes, and models without effecting the efficiency and effectiveness of the saw upon which the device is attached; and f. provide an easy-to-install, easy-to-use, and economical dust capture device for cut-off power saws.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, for a power cut-off saw the present invention contemplates a debris-collection device having a collection member with an inner chamber, a bottom, a top with a top slot thereon, and a front with a front slot which is in communication with the top slot, both slots being adapted to receive a saw blade; a discharge arm on the top of the collection chamber with a hollow channel within in communication with the inner chamber and extending upward therefrom to an opening at its top; and a mounting member attachable to the discharge arm and removably attachable to the shield of the cut-off saw. The top slot may, but need not have, one or more debris-control components covering the slot but permitting entry of the saw blade. Across the bottom front is at least one debris-component for easing the movement of the cut-off saw and for preventing dust generated by the cut-off saw from permeating the environment.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which the cut-off saw to which the present invention is attached is in partial views only. The drawings are:

FIG. 3 is a side elevation view of a second embodiment of the present invention.

FIG. 4 is a front elevation view of the second embodiment of the present invention.

FIG. 5 is a top plan view of the second embodiment of the present invention.

FIG. 6 is a bottom plan view of the second embodiment of the present invention.

FIG. 8 is a front elevation view of a third embodiment of the present invention.

FIG. 9 is a top plan view of the third embodiment of the present invention.

FIG. 10 is a bottom plan view of the third embodiment of the present invention.

DETAILED DESCRIPTION OF THE INVENTION

Figure 1:
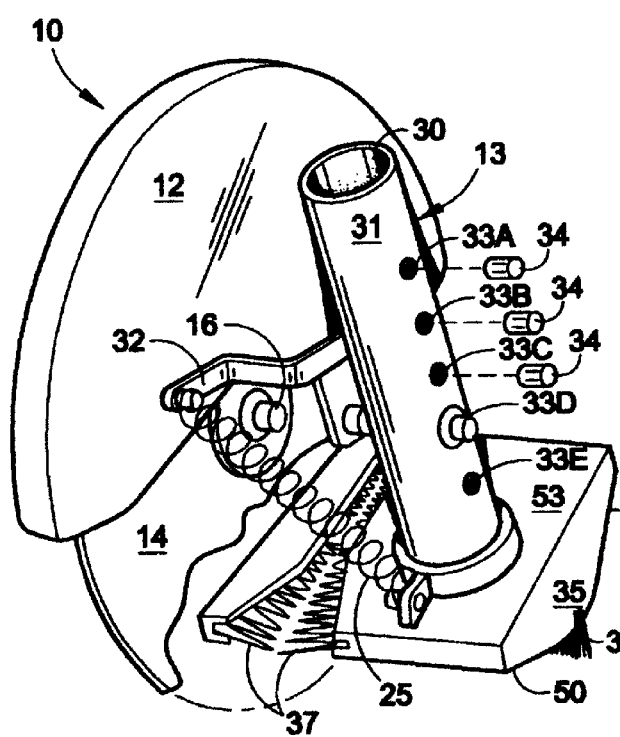
FIG. 1 is a perspective view of one embodiment of the present invention attached to a cut-off saw.

Referring now to the drawings in detail and in particular to FIG. 1, reference character 10 represents a powered cut-off saw in partial view (e.g., motor and handle not illustrated) having a saw shield 12, and saw blade 14 retained onto the saw 10 by a saw-blade mounting bolt 16. The debris-collection device 13 is attached to the saw 10 generally on the saw shield 12 by a mounting member or bracket 32 or similar structure suited for the intended purpose. The composition of such mounting members 32 may include, but not be limited to, any metal, any polymer, any composite, or any one or more combinations thereof.

Saws of this nature generally have one or more water jets or holes 18 (illustrated in FIG. 7B) the purpose of which, as described above, is to inject a stream of water onto the blade 14 to minimize the dispersement of dust as the saw blade 14 cuts the surface. The mounting member 32 is designed and pre-determined in such design to align with such water holes 18 of the various models of conventional cut-off saws. The mounting member 32 has a pivot member 22, the center point of which also is designed and pre-determined in such design for the various cut-off saws to be approximately at the axis of rotation of the saw-blade mounting bolt 16 of each respective cut-off saw. The center point of the mounting member 32 may be an aperture suited for accepting therethrough a bolt or other similar fastening member 23; or it may be a shaft-like extension on the pivot member 22 with or without a threaded end.

The debris-collection device 13 also has collection member 35 having an inner chamber and, as illustrated, a tube-like extension or discharge arm 31 projecting upward therefrom. The discharge arm 31 may be of any shape, including, but not limited to, round, oval, rectilinear, multi-sided, and the like provided it has a hollow channel within which is in open communication with the inner chamber of the collection member 35. There is an opening 30 at the top of the discharge arm 31 over which or into which an external vacuum hose 20 (shown in FIG. 2) attaches.

The discharge arm 31 also has a means for adjusting the debris-collection device 13 to the varying saw blade 14 diameters such that the debris-collection device 13 may be attached to various saws having differing blade diameters. A series of apertures 33A–E on the discharge arm 31 serves as the adjustment mechanism of the debris-collection device 13 in this illustration. It must be noted that the quantity of such apertures in the drawings is by way of example only and does not serve as a means of limitation. Any number may be placed on the discharge arm 31. A corresponding aperture 33A–E is on the opposing side of the discharge arm 31. The series of paired apertures 33A–E may be spaced apart at any relative vertical distance from one another. One-inch increments, however, are best suited to accommodate most blade diameter variances. These apertures 33A–E also serve to attach the discharge arm 31 to the mounting member 32 at the pivot member 22 using the shaft-like extension of a bolt 23. If the pivot member 22 has an aperture, then a bolt or similar fastening device 23 is inserted through the pivot member 22 aperture and through any desired paired apertures 33A–E of the discharge arm 31. If the pivot member 22 has an extending shaft-like member, then any one of the desired paired apertures 33A–E of the discharge arm 31 is inserted over the shaft. The shaft in such cases could be threaded and a suitable corresponding nut may be placed and tightened thereon. As attached, the debris-collection device 13 at the discharge arm 31 point of attachment may pivot or swing back and forth as necessary with the operation of the saw 10.

As mentioned above, the debris-collection device 13 may be adjusted to accommodate virtually any diameter size saw blade 14. As illustrated in FIG. 1, the discharge arm 31 is fastened to the pivot member 22 through aperture 33D. For illustration purposes only, and not by way of limitation, assume the distance from aperture 33D to the bottom of the collection member 35 is approximately six inches. Given that the center point of the aperture 33D, as attached to the pivot member 22, is approximately aligned with the axis of rotation (line x—x of FIG. 2) of the saw-blade mounting bolt 16, as attached the debris-collection device 13 is on a cut-off saw having a twelve-inch blade. Assume that each adjacent aperture is about one inch from its respectively adjacent aperture. Then, attaching the debris-collection device 13 using aperture 33E will accommodate a cut-off saw having a ten-inch blade; attaching to aperture 33C will accommodate a cut-off saw having a fourteen-inch blade; and so on.

The apertures 33A–E may be pre-bored on the discharge arm 31; may be indentations spaced apart as described above and which are not bored through thereby permitting the user to fashion the bore for the saw being used; or may be pre-bored apertures with insertable and removable plugs 34; or any one or more combinations thereof.

FIGS. 3–6 are detailed illustrations of the debris-collection device 13 without the mounting member 32 attached. The collection member 35 has a top 53, a bottom 56, and a front 50. FIG. 1 revealed the front 50 and bottom 56 to be seemingly curvilinear in juxtaposition. In FIG. 3, as well as in FIGS. 7A–7C, the front-to-bottom relationship reflects definite angles. Either configuration is suited for the intended purpose to be explained later in detail. As illustrated here, the front 50, relative to the top 53, is angled downward and rearward. This angle, represented by reference character "L" may be between about 30° to about 80°. Also as illustrated here, the bottom 56, relative to the front 50, is angled upward and rearward. This angle, represented by reference character "M" may be between about 90° to about 170°. A debris-control member 39 is located at the bottom 56 near to the front 50 of the collection member 53. The debris-control member 39 may, but need not, extend from one side to the other side of the front 50 as illustrated in FIG. 4. It is best, however, that it extend from one side to the other for the reasons expressed below.

There is a slot or opening 51 on the front 50, and generally to the front of the debris-control member 39, which extends upward to the top 53. The slot 51 is wider 52 at the top than at the bottom and generally may resemble a "V" shape. Reference to FIG. 5 reveals a slot or opening 54 on the top 53 which may, but need not, extend from front to rear. Generally, however, it is best that the slot 54 extend nearly if not fully from front to rear to thereby accommodate and facilitate saw blade 14 insertion into the inner chamber of the collection member 35. The top slot 54 is wider 55 at the front 50 also generally resembling a "V" shape. This wider section 55 is in open communication with the wider section 52 of the front slot 51. Also on the top slot 54 there is a debris-control member 37 generally covering the top slot 54 and wider section 55. This debris-control member 37 may be, but need not comprise more than one section. It is best, however, that it comprise at least two sections, one section on each side of the top slot 54 such that the two sections of the debris-control member 37 either nearly touch, touch, or overlap. The function of this debris-control member 37 is: (1) to control and retain dust and debris entering the inner chamber of the collection member 35 when the cut-off saw 10 is in operation and the debris-collection device 13 attached thereto; (2) to maintain a flexible, yet somewhat rigid or stiff, seal for the inner chamber of the collection member 35; and (3) thereby, to facilitate suctioning of debris from the inner chamber when an external vacuum hose 20 is attached to the discharge arm 31 and is vacuuming out the debris.

Figure 7A:
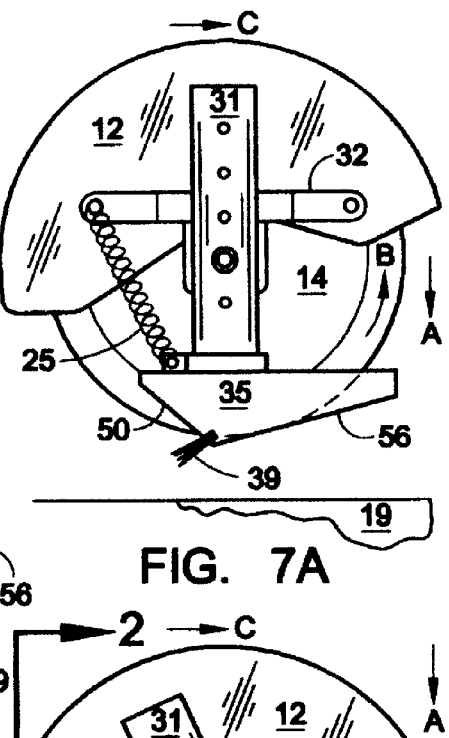
FIGS. 7A–7C are side elevation views of the second embodiment of the present invention attached to a cut-off saw in various phases of operation.
Figure 7B:
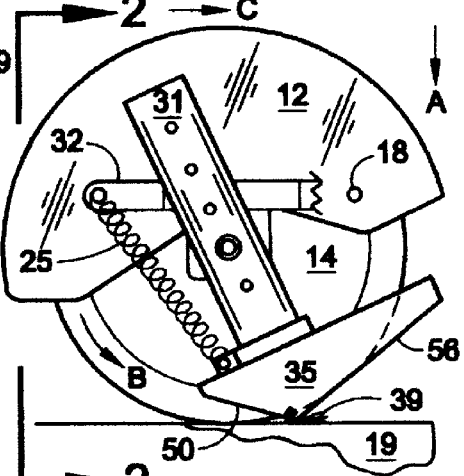
Figure 7C:
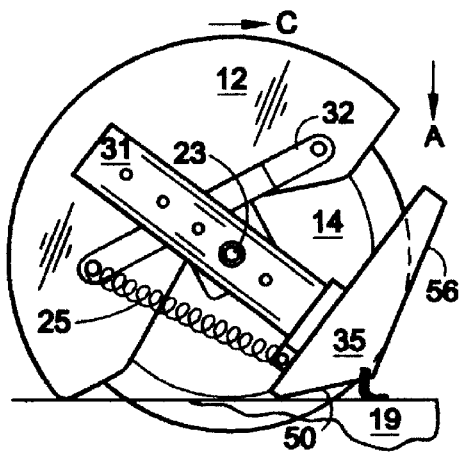

FIG. 7A illustrates the debris-collection device 13 attached to a cut-off saw 10. The saw blade 14 is not in contact with the surface 19 to be cut. A user would move the saw 10 in the direction of arrow A to initiate contact with the surface 19 to be cut. The blade 14 rotates in direction of arrow B. The saw, when in contact with the surface 19 to be cut, is moved for cutting in the direction of arrow C. As the saw 10 is moved to the surface 19, the bottom front 50 and/or debris-control member 39 strikes the surface 19 and, given its angle and location (or if curved as in FIG. 1), will 'give' or move in the direction of arrow C permitting the blade 14 to contact the surface 19. As the blade 14 cuts the surface 19, concrete dust plumes slightly upward and outward (much like a water-wave formed by a fast-moving water skier). The wider section of the front 52 primarily, and the top 55 facilitate the 'capture' of the waving and expanding plume, especially for more shallow cuts (a representation of a shallow cut is illustrated in FIG. 7B; here, as the saw 10 is pressed downward in the direction of arrow A, the debris-collection device 13 pivots to the rear of the saw and slightly upward thereby permitting the blade 14 to contact the surface 19). The debris-control member 39 on the bottom 56 aids in keeping the debris in front of the collection member 35 and also aids the user in moving the saw 10 during the cutting process by reducing the friction one would experience should the collection member 35 fully contact the surface 19 being cut rather than the debris-control member 39. FIG. 7C illustrates a deeper cut. To effect such a deeper cut, the user presses the front of the saw 10 down and slightly forward. With this motion, the collection member 35 pivots back and up thereby permitting the blade 14 to enter down into the surface nearly to the full radius of the blade. The bias member or spring 25, as illustrated in the figures, biases the front of the saw shield 12 to the collection device. The spring 25 may be on the saw shield 12 or on the mounting member 32 and the other end of the spring 25 may be on the collection member 35 or on the discharge arm 31 provided the function of the bias member 25 is realized.

Figure 2:
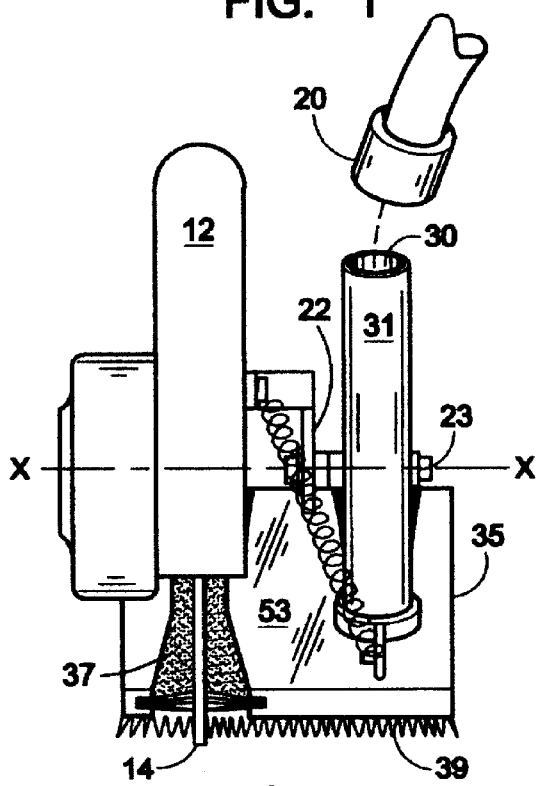
FIG. 2 is a front elevation view of the present invention attached to a cut-off saw as taken on line 2—2 of FIG. 7B.

The debris-control member 37 and the bottom debris-control member 39 should be of a flexible and pliable, yet somewhat rigid or sturdy, material such as, but not limited to, bristles, brush-like, rubber, vinyl, nylon strips or blades, any suitable polymer, and the like; or may be solid as illustrated in FIG. 2 for the top debris-control member 37 and may be comprised of rubber, vinyl, nylon strips or blades, any suitable polymer, and the like. The debris-control members 37, 39 to function as desired and described above, must have the features described above and thereby will flex to permit entry of the saw blade 14 into or between the top debris-control member 37 and to rotate relatively freely therein; and will also relatively seal the inner chamber due to the sturdiness and or rigidity to thereby prevent dust generated by the cutting process from escaping.

When the debris-collection device 13 is attached to a cutoff saw 10, the blade 14 will rest and ride in or between the debris-control member 37 on the top slot 54. The flexible sturdiness of the debris-control member 37 will not only 'seal' the inner chamber to prevent escape of captured debris but also will 'clean' the rotating blade 14 as it continues to cut the surface 19.

FIGS. 8–10 illustrate yet another embodiment of the present invention. In this embodiment, the debris-control member 37 on the top slot 54 is eliminated and the wider "V" openings of the front and top slots, respectively 52, 55, are likewise eliminated [though the wider opening 52 of the front slot 51 may be retained]. The openings of the top slot 54 and the front slot 51 are approximately equal in width throughout and in communication with one another. The width of the opening is represented by plane E-H in FIG. 9. The width of the saw blade [illustrated in phantom line] is represented by plane F-G. In this regard, the width of E-H [the opening in the respective slots 51, 54] is greater than the width of F-G [the saw blade 14]. Width E-H should be sufficient to accommodate the saw blade 14, provide some tolerance width for, and/or caused by, the saw blade while stationary or during rotation, yet maintain a relative 'vacuum' seal for the inner chamber of the collection member 35.

For proper operation of the device, the spacing or width of E-F and G-H should be between one-sixteenth of an inch and three-eighths of an inch. Ideal spacing should be about one-eighth of an inch. With this embodiment, the front slot 51 may, but need not, also include the wider "V" shape opening 52 at the top [i.e., wider than at the bottom] as shown in FIG. 4. This facilitates the 'capture' of the waving and expanding plume, especially for more shallow cuts [a shallow cut is represented and illustrated in FIG. 7B].

The present disclosure includes that contained in the present claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention. Accordingly, the scope of the invention should be determined not by the embodiment[s] illustrated, but by the appended claims and their legal equivalents.

The invention claimed is:

1. A debris-collection device for portable power saws having a saw blade and a saw shield, said debris-collection device comprising:
   (a) a collection member having an inner chamber, a bottom, a top with a top slot thereon for receiving the saw blade, and a front with a front slot thereon, said front slot extending downward and rearward on said bottom defining a bottom slot on said bottom, said top slot and said front slot and said bottom slot adapted to receive the saw blade therethrough such that the saw blade extends forward of said front slot and in front of said debris-collection device when in operation;
   (b) a discharge arm on the top of said collection chamber, said discharge arm having a hollow channel within in communication with said inner chamber and extending upward therefrom to an opening at its top; and
   (c) a mounting member attachable to said discharge arm and removably attachable to the saw shield.

2. The device as defined in claim 1 further comprising one or more debris-control means for controlling debris within and adjacent to said collection member wherein at least one of said one or more debris-control means is in contact with the saw blade.

3. The device as defined in claim 2 wherein said one or more debris-control means is on the top slot of said collection member.

4. The device as defined in claim 2 wherein said one or more debris-control means is on the bottom of said collection member.

5. The device as defined in claim 2 wherein said one or more debris-control means comprises a material selected from the group consisting of bristles, brushes, vinyl blades, rubber blades, and nylon blades.

6. The device as defined in claim 2 wherein said top slot and said front slot have openings which are of approximate equal width throughout each of said top slot and said front slot and wherein such width is greater than the saw blade width.

7. The device as defined in claim 1 wherein said top slot has a wider opening at the front.

8. The device as defined in claim 1 wherein said front slot has a wider opening at the top.

9. The device as defined in claim 1 further comprising adjustment means on said discharge arm for adjusting said device to mount onto power saws having differing saw blade diameters.

10. The device as defined in claim 9 wherein said adjustment means comprises a plurality of paired apertures on opposing sides of said discharge arm.

11. The device as defined in claim 1 wherein said mounting member further comprises a pivot means to allow said discharge arm to pivot freely thereon and to self-adjust to a depth of cut, said pivot means having a center which is aligned with an axis of rotation of the saw blade.

12. The device as defined in claim 1 further comprising a bias means for biasing the saw to the collection member.

13. The device as defined in claim 12 wherein said bias means comprises a spring connected to said mounting member and to said discharge arm.

14. The device as defined in claim 12 wherein said bias means comprises a spring connected to said mounting member and to said collection member.

15. The device as defined in claim 1 wherein the front is angled downward and rearward from the top at an angle of between about 30° to about 80° and the bottom is angled rearward from the front at an angle of between about 90° to about 170°.

16. The device as defined in claim 1 wherein the front at its point of adjacency to the bottom is curvilinear.

* * * * *